United States Patent [19]

Mallya

[11] Patent Number: 4,780,503

[45] Date of Patent: Oct. 25, 1988

[54] CARBOXYLATED LATEX

[75] Inventor: Prakash Mallya, Pasadena, Calif.

[73] Assignee: Polysar Limited, Sarnia, Canada

[21] Appl. No.: 898,191

[22] Filed: Aug. 20, 1986

Related U.S. Application Data

[60] Division of Ser. No. 744,476, Jun. 13, 1985, Pat. No. 4,657,966, which is a continuation of Ser. No. 499,063, May 27, 1983, abandoned.

[30] Foreign Application Priority Data

Apr. 25, 1983 [CA] Canada ............................ 426470

[51] Int. Cl.[4] .............................................. C08F 2/16
[52] U.S. Cl. .................................... 524/460; 524/458; 526/80; 526/81; 526/201
[58] Field of Search ............... 524/458, 460; 526/80, 526/81, 201

[56] References Cited

U.S. PATENT DOCUMENTS

| | | | |
|---|---|---|---|
| 3,714,097 | 1/1973 | Cautilli et al. | 526/201 |
| 4,254,004 | 3/1981 | Abbey | 526/80 |
| 4,272,426 | 6/1981 | Feast | 526/80 |

FOREIGN PATENT DOCUMENTS

| | | | |
|---|---|---|---|
| 0068461 | 1/1983 | European Pat. Off. | 526/80 |
| 0039194 | 10/1974 | Japan | 526/80 |
| 0065385 | 6/1978 | Japan | 526/80 |
| 0133080 | 7/1985 | Japan | 524/458 |

*Primary Examiner*—Joseph L. Schofer
*Assistant Examiner*—J. M. Reddick
*Attorney, Agent, or Firm*—Stevens, Davis, Miller & Mosher

[57] ABSTRACT

A high solids latex of a functional monomer may be prepared by emulsion polymerization of the monomer charge to a specified overall conversion and then introducing an additional micelle forming surfactant or a unimodal seed latex and continuing the polymerization.

4 Claims, No Drawings

CARBOXYLATED LATEX

This is a division of application Ser. No. 744,476, filed June 13, 1985, now U.S. Pat. No. 4,657,966, which in turn is a continuation of application Ser. No. 499,063, filed May 27, 1983, now abandoned.

DISCLOSURE

Polymeric material in aqueous dispersions are finding a wide range of applications in a number of diverse fields. Latices of polymers containing functional groups are becoming increasingly popular as the polymer may be tailored to specific end use applications. Such latices tend to be stable and are less subject to particle agglomeration than non-functional polymers which do not contain stabilizing functional groups. It is uneconomical to subject latices of polymers containing functional groups to conventional techniques which make it possible to increase the polymeric solids content of the latex above about 55 per cent. This presents a number of drawbacks including the cost of shipping and costs of removal of water from the latex compound in the manufacture of products.

BACKGROUND OF THE INVENTION

Additionally, at a polymeric solids content of about 55 per cent, latices of polymers containing functional groups tend to have a relatively high viscosity. This presents a drawback in the application of such latices in coating compositions as the viscosity of the composition should usually be low.

U.S. Pat. No. 3,637,563 issued Jan. 25, 1972, to Christena, assigned to the Celanese Corporation discloses a process for the manufacture of high solids acrylate latices. In the process, a pre-emulsion is made. The pre-emulsion is a water in hydrocarbon emulsion. The present invention does not require the use of such pre-emulsion.

British Pat. No. 1,191,649 published May 13, 1970, in the name of the Celanese Corporation discloses a process wherein a high solids vinyl acetate latex is produced by polymerizing a monomer emulsion in water in the presence of a minimum amount of surfactant and catalyst to form a relatively large particle size latex. At about 50 to 90 percent conversion, additional surfactant is added to further stabilize the latex originally formed. The present process contemplates the addition of the surfactant to create a new population of particles.

U.S. Pat. No. 4,130,523 issued Dec. 19, 1978, to Hoy et al, assigned to Union Carbide teaches a process for producing a high solids latex which requires the continuous withdrawal of a portion of the partially polymerized emulsion and adding fresh monomer dispersion. In the final step the withdrawn emulsion is returned to the reaction vessel. The present patent application does not require the withdrawl or cycling of partially polymerized monomer dispersion.

In theory, the method for increasing the solids content of a latex is to improve the degree of packing of the polymer particles. If the latex contains only particles of a relatively large uniform size, there are significant voids between the polymer particles which can now be filled with smaller particles.

The object of the prior art patents, and the present patent is to produce a high solids latex having a low viscosity. To do this, one must create a bimodal or polydisperse particle size distribution in the latex during polymerization. In the prior art, when latices of different particle sizes were blended and concentrated, solids levels could be increased when the diameters of the large particles was about 1600 A and the diameters of the small particles was about 900 A. The weight ratio of large to small particles was in the range of about 70:30 to 75:25.

SUMMARY OF THE INVENTION

The applicant has found it possible to directly produce a latex having a bimodal particle distribution by the introduction of additional micelle forming surfactant or unimodal seed particles into the emulsion being polymerized. This avoids subsequent steps of blending and concentrating the latex.

DESCRIPTION OF THE PREFERRED EMBODIMENTS

The present invention provides a process for the synthesis of a latex having a viscosity of less than about 3000 cps and a bimodal particle size distribution so that from about 65 to 85 percent by weight of the polymer particles have a diameter of from about 1700 A to about 3000 A and from about 35 to 15 percent by weight of the polymeric particles have a diameter of from about 300 A to about 1000 A by the polymerization of an emulsion containing from about 50 to about 75 parts by weight of water per 100 parts by weight of nonvolatiles comprising nonmonomeric additives and a mixture of ethylenically unsaturated monomers containing from about 0.5 to 10 parts by weight per 100 parts by weight of monomers of a monomer from the group comprising $C_{3-6}$ ethylenically unsaturated acids, aldehydes, ketones and amides which may be unsubstituted or substituted by a $C_{1-4}$ alkyl group or a $C_{1-4}$ alkanol group; or a mixture thereof and from 0 to 25 parts by weight per 100 parts by weight of a $C_{1-8}$ alkyl or alkanol ester of a $C_{3-6}$ ethylenically unsaturated acid; which comprises nucleating polymer particles in the emulsion and polymerizing the monomer therein to an overall conversion of from about 40 to 60 weight percent and then introducing either (a) from about 0.75 to 2.0 additional parts by weight of a micelle forming surfactant per 100 parts by weight of total monomer, or (b) from about 2.5 to 4.5 parts by weight per 100 parts of monomer of a unimodal seed latex having a particle size of from about 275 A to about 400 A, and continuing the polymerization substantially to completion.

The present invention also provides a latex containing from about 58 to 65 percent by weight of polymeric solids of ethylenically unsaturated monomers containing from about 0.5 to 10 percent by weight of the polymeric solids of the residue of a $C_{3-6}$ ethylenically unsaturated acid, aldehyde ketone or amide which may be unsubstituted or substituted by a $C_{1-4}$ alkyl or alkanol group, and from 0 to 25 percent by weight of a $C_{1-8}$ alkyl or alkanol ester of a $C_{3-6}$ ethylenically unsaturated acid, or a mixture thereof which at a polymeric solids content of about 61 percent by weight has a viscosity of less than about 3000 cps, and has a bimodal particle size distribution so that from about 65 to 85 percent by weight of the polymer particles have a diameter of from about 1700 A to about 3000 A and from about 35 to 15 percent by weight of the particles have a diameter of from about 300 A to about 1000 A.

The large diameter particles will have a particle size of from 1700 A to 3000 A and the small particles will have a particle size of from about 400 A to about 1000

A. Preferably from about 65 to 80 percent by weight of the latex particles have a diameter of from about 1800 A to about 2100 A and from about 35 to 20 percent by weight of the particles have a diameter of from about 450 A to about 650 A.

The methods of emulsion polymerization are well known in the art. There are many texts, papers and publications dealing with conventional methods of emulsion polymerization. Useful reference texts discussing emulsion polymerization techniques include:

"High Polymer Latices" by D. C. Blackley, 1966 MacLaren & Sons Limited, London (Chapter 5);

"Synthetic Rubber" by G. S. Whitby, John Wiley & Sons Inc., 1954, New York;

"Emulsion Polymerization", Piirma & Gardon, American Chemical Society, 1976, Washington, D.C.; and "Emulsion Polymerization" by Irja Piirma, Academic Press Inc., 1982, New York.

Useful monomers contain an ethylenically unsaturated carbon-carbon bond such as vinyl chloride, vinylidene chloride, acrylates or methacrylates, or vinyl monoaromatic monomers such as styrene. The vinyl monomers may be unsubstituted or substituted by a $C_{1-4}$ alkyl group or chlorine or bromine atoms such as $\alpha$-methyl styrene, p-methyl styrene, vinyl toluene, or their brominated or chlorinated derivatives. Useful monomers also include aliphatic $C_{4-8}$ conjugated dienes such as 1,3-butadiene and isoprene.

The present invention requires the incorporation of one or more monomers with a functional group in an amount from 0.5 to about 10, preferably about 5 parts by weight per 100 parts by weight of total monomer.

As used herein, the term functional group is intended to mean a polar group such as an acid, aldehyde, ketone or amide group. Such monomers will contain, in addition to the functional group, at least one ethylenic unsaturation. The functional monomers will preferably be relatively short, containing straight chain alkenyl radicals of up to about 8 carbon atoms. Most preferred are alkenyl radicals of up to about 6 carbon atoms.

In the manufacture of latices of rubbery polymers of a vinyl monomer and a conjugated diene the ratio of the charge of vinyl monomer to diene will vary over a broad range. In latices of polymers of vinyl monoaromatic-conjugated diene containing a functional group the vinyl monoaromatic monomer may be present in an amount of from about 20 to 70 weight percent of the monomer charge and the conjugated diene may be present in an amount from about 20 to 70 weight percent of the monomer charge. Preferably the vinyl monoaromatic monomer is present in an amount from about 30 to 60 weight percent of the monomer charge and the conjugated diene is present in an amount of from about 30 to 60 weight percent of the monomer charged.

The monomer containing the functional group may be present in an amount from about 0.5 to about 10 weight percent of the monomer charge. The amount used usually depends upon the intended use of the polymer. In many instances a preferred range of functional monomer is from about 0.5 to 5 weight percent of the total monomer charge. A most preferred range of functional monomer is from about 0.75 to about 3 weight percent of the monomer charge.

Preferred monomers containing functional groups are acids or amides which may be unsubstituted or substituted by a $C_{1-4}$ alkyl or a $C_{1-4}$ alkanol group. Typical acids include mono- or di-acids such as acrylic, methacrylic, maleic, fumaric and itaconic acid. Typical amides include $C_{3-6}$ amides which may be unsubstituted or substituted by a $C_{1-4}$ alkyl group or a $C_{1-4}$ alkanol group such as acrylamide, methacrylamide, and N-methylol acrylamide. Useful aldehydes include $C_{3-6}$ aldehydes including cinnamaldehyde.

The monommer mixture may optionally include up to 25 parts by weight per 100 parts by weight of monomers of a $C_{1-8}$ alkyl or alkanol ester of a $C_{3-6}$ ethylenically unsaturated acid. If present the ester is usually used in amounts up to about 10 percent by weight, most preferably in amounts not greater than 5 weight percent. Typical esters include methyl, ethyl, propyl, butyl, pentyl, hexyl, 2-ethyl hexyl, $\beta$-hydroxy ethyl esters of acrylic, methacrylic, 3-butenoic acid, crotonic acid, 4-pentenoic and 5-hexenoic acid.

The additional micelle forming surfactant or unimodal seed particles are introduced into the emulsion being polymerized when the overall conversion has reached about 40 to 60 weight percent based on the weight of the total monomer being polymerized. Most preferably the surfactant or the seed particles are introduced when the overall conversion is about 50 weight percent.

There are a great many surfactants available for emulsion polymerization. Commercially available surfactants are widely promoted in trade literature such as "McCutchon's Emulsifiers and Detergents" published annually. The initial polymerization may be conducted using a mixed nonionic and anionic emulsifier or an anionic emulsifier.

Preferably the additional micelle surfactant is anionic. Conventional anionic surfactants include alkali salts, alkaline earth metal salts, or quaternary amine derivatives of alkyl ether sulfates, alkyl sulfates, aryl sulfates, alkyl aryl sulfates, alkyl phosphates, aryl phosphates, alkyl aryl phosphates, alkyl sulfonates, aryl sulfonates or alkyl aryl sulfonates. The alkyl radical in such surfactants are usually medium to long chain groups having from 8 to about 25 carbon atoms, such as stearic or lauryl radicals. Aryl substituents are aromatic compounds of from about 6 to 10 carbon atoms such as benzene, napthalene, toluene, or xylene. Typical anionic surfactants include sodium lauryl sulfate, sodium lauryl sulfonate, sodium dodecyl benzene sulfonate, sodium dodecyl benzene sulfate, sodium xylene sulfonate, and potassium oleate.

The unimodal seed particle has a particle size between 250 A and 400 A, preferably about 300 A. The seed latex must be sufficiently stable so that it will not coagulate when added to the emulsion. Additionally the seed latex must be compatible with the polymer being formed in the emulsion. Preferably the seed latex is a latex of a carboxylated styrene butadiene polymer. It is advantageous if the seed is fairly highly carboxylated having at least about 1.0% carboxylation. The amount of seed latex added depends on the particle size of this seed latex and the final particle size after polymerization that is desired.

The following examples are intended to illustrate the scope of the invention and are not intended to limit the invention. In the examples unless otherwise stated the parts in the formulation are parts by weight per 100 parts of monomer.

Latex was prepared using conventional free radical emulsion polymerization methods from a feed stock comprising about 60 parts styrene, 38 parts butadiene and the specified parts of functional monomer and ester. The reaction time was about 10 hours to greater than 95 percent conversion and a theoretical solids level of about 60 percent.

In Table 1, sodium lauryl ether sulfate was introduced into the emulsion polymerization at the specified weight percent of solids in the reactor in the specified amount. The actual solids, the theoretical solids and the viscosity of the resulting latex was determined. In the last example, N, a seed latex having a number average diameter of 368 A was added instead of the surfactant. The amount of seed latex added was 3.12 pphm.

TABLE I

| Reaction | Total Water pphm | Functional Monomer Type | Functional Monomer pphm | Overall Conversion, % | Increment Surfactant pphm | Theo. Solids % | Final Reactor Solids % | Viscosity (#3 at 30 rpm) cps | $D_L$ Å | $D_S$ Å | $W_L$ | $W_S$ |
|---|---|---|---|---|---|---|---|---|---|---|---|---|
| A | 71.4 | IA | 2.25 | 44.7 | 1.13 | 59.19 | 58.0 | 280 | | | | |
| B | 71.4 | IA | 2.25 | 48.7 | 1.13 | 59.15 | 57.6 | 240 | | | | |
| C | 71.4 | IA | 2.25 | 41.8 | 1.24 | 59.15 | 57.8 | 200 | | | | |
| D | 71.5 | IA | 2.1 | 44.6 | 1.24 | 61.06 | 59.4 | 600 | | | | |
| E | 66.7 | IA | 2.1 | 48.5 | 1.24 | 62.6 | 60.8 | 800 | | | | |
| F | 71.5 | IA<br>MA | 2.0<br>1.0 | 50.6 | 1.24 | 59.15 | 57.3 | 120 | | | | |
| G | 71.5 | IA<br>AA | 2.0<br>1.0 | 46.5 | 1.24 | 59.15 | 57.8 | 340 | | | | |
| H | 71.5 | IA<br>AM | 2<br>1 | 45.7 | 1.24 | 59.15 | 58.0 | 540 | 2040 | 582 | 68.1 | 31.9 |
| I | 72.1 | MA<br>AM<br>n-Ba<br>MMA | 4<br>2<br>5.9<br>9.1 | 43.7 | 2.0 | 59.15 | 58.2 | 340 | 2181 | 473 | 68.3 | 31.7 |
| J | 72.1 | MA<br>AM<br>n-BA<br>MMA | 1.0<br>2.0<br>3.0<br>4.5 | 43.0 | 2.0 | 59.15 | 57.2 | 600 | 2219 | 585 | 85.8 | 14.2 |
| K | 71.5 | IA<br>AM | 1<br>2 | 46.0 | 1.24 | 59.15 | 57.6 | 1420 | 2169 | 463 | 80.5 | 19.5 |
| L | 72.1 | MA<br>n-BA<br>MMA | 1<br>5.9<br>9.0 | 53.5 | 2 | 59.15 | 57.5 | 320 | 2245 | 389 | 85.4 | 14.6 |
| M | 59.13 | IA | 2 | 42.2 | 1.24 | 63.5 | 61.7 | 1920 | | | | |
| N | 71.4 | IA | 2.25 | 50 | 3.12 | 59.12 | 58.2 | 800 | 2550 | 980 | 84.5 | 15.5 |

In the table the abbreviations have the following meanings:

IA=itaconic acid
MA=methacrylic acid
AA=acrylic acid
AM=acrylamide
n-BA=n butyl acrylate
MMA=methyl methacrylate
$D_L$=diameter of large particles, Å
$D_S$=diameter of small particles, Å
$W_L$ & $W_S$=weight percentages of large and small particles The viscosity was measured using a Brookfield LVT (trade name) viscometer using a #3 spindle at 30 rpm. As used in this specification, A=Å=Angstroms.

What is claimed is:

1. A process for the synthesis of a latex having a viscosity of less than about 3000 cps and a bimodal particle size distribution so that from 65 to 85 percent by weight of the polymer particles have a diameter of from 1700 A to about 3000 A and from 35 to 15 percent by weight of the polymeric particles have a diameter of from about 300 A to about 1000 A by the polymerization of an emulsion containing from about 50 to 75 parts by weight of water per 100 parts by weight of non volatiles comprising non monomeric additives and a monomer mixture comprising from about 20 to 70 weight percent of the total monomer charge of an aliphatic $C_{4-6}$ conjugated diolefin; from about 20 to 70 weight percent of the total monomer charge of a vinyl monoaromatic monomer and from 0.5 to 10 weight percent of the total monomer charge of at least one monomer selected from the group consisting of $C_{3-6}$ ethylenically unsaturated acids, aldehydes, ketones and amides which are unsubstituted or substituted by a $C_{1-4}$ alkyl or alkanol radical and 0 to 25 weight percent of a $C_{2-8}$ alkyl or alkanol ester of a $C_{3-6}$ ethylenically unsaturated carboxylic acid; which comprises nucleating polymer particles in the emulsion and polymerizing the monomer therein to an overall conversion of from about 40 to 60 percent and then introducing from about 2.5 to 4.5 parts by weight per 100 parts of monomer of a unimodal carboxylated stryene butadiene seed latex having a particle size of from about 275 A to about 400 A, and continuing the polymerization substantially to completion.

2. A process according to claim 1 wherein the latex has a particle size distribution so that from about 65 to about 80 percent by weight of the polymer particles have an average diameter of from about 1800 A to about 2100 A and about 35 to about 20 weight percent by weight of the particles have an average diameter of from about 450 A to about 650 A.

3. A process according to claim 2 wherein the seed latex has a particle size of about 300 A.

4. A process according to claim 3 wherein the monomer mixture comprises:
from 30 to 60 weight percent of butadiene;
from 30 to 60 weight percent of styrene; and
from 0.5 to 5 weight percent of one or more monomers selected from acrylic acid, methacrylic acid, fumaric acid, itaconic acid, acrylamide, methacrylamide, butyl acrylate, ethylhexyl acrylate, β-hydroxyethyl acrylate and N-methylol acrylamide.

* * * * *